US 9,040,850 B2

United States Patent
Huang et al.

(10) Patent No.: US 9,040,850 B2
(45) Date of Patent: May 26, 2015

(54) ASSEMBLING A KEYPAD TO A MOBILE DEVICE

(75) Inventors: Li Huang, Kitchener (CA); Albert Murray Pegg, Cambridge (CA); Paul Masser, Heidelberg (CA)

(73) Assignee: BlackBerry Limited, Waterloo, Ontario (CA)

( * ) Notice: Subject to any disclaimer, the term of this patent is extended or adjusted under 35 U.S.C. 154(b) by 651 days.

(21) Appl. No.: 13/311,152

(22) Filed: Dec. 5, 2011

(65) Prior Publication Data

US 2013/0140163 A1 Jun. 6, 2013

(51) Int. Cl.
*H01H 9/00* (2006.01)
*G06F 1/20* (2006.01)
*G06F 1/16* (2006.01)
*G06F 3/02* (2006.01)

(52) U.S. Cl.
CPC ............ *G06F 1/1662* (2013.01); *Y10T 29/4987* (2015.01); *H01H 9/00* (2013.01); *G06F 1/20* (2013.01); *G06F 3/0202* (2013.01); *G06F 1/1626* (2013.01); *G06F 1/1671* (2013.01)

(58) Field of Classification Search
USPC ............... 200/5 A, 5 E, 187, 1 TK, 343, 344;
361/679.08–679.2, 607.26, 679.3,
361/679.55, 679.6; 455/575.1–575.9, 350;
400/492, 682
See application file for complete search history.

(56) References Cited

U.S. PATENT DOCUMENTS

| | | | |
|---|---|---|---|
| 4,263,659 A | 4/1981 | Hirata et al. | |
| 4,716,262 A * | 12/1987 | Morse | 200/5 A |
| 5,490,037 A | 2/1996 | Clancy | |
| 5,616,897 A | 4/1997 | Weber et al. | |
| 5,648,771 A | 7/1997 | Halgren et al. | |
| 5,734,136 A * | 3/1998 | Newcomer et al. | 200/5 A |
| 6,603,408 B1 | 8/2003 | Gaba | |
| 6,609,660 B1 * | 8/2003 | Stoner | 235/462.22 |
| 6,809,660 B2 * | 10/2004 | Bestle | 341/20 |
| 6,882,336 B2 | 4/2005 | Lahr | |
| 6,894,626 B2 | 5/2005 | Olodort et al. | |
| 7,091,436 B2 | 8/2006 | Serban | |
| 7,463,480 B2 | 12/2008 | Song | |
| 7,532,460 B2 | 5/2009 | Singh et al. | |
| 7,579,561 B2 | 8/2009 | Wee et al. | |
| 7,702,356 B2 * | 4/2010 | Choi | 455/550.1 |

(Continued)

FOREIGN PATENT DOCUMENTS

GB 2103882 2/1983
WO 2009/094804 8/2009

OTHER PUBLICATIONS

Extended European Search Report issued in European Application No. 11192250.6 on Mar. 5, 2013; 5 pages.

(Continued)

*Primary Examiner* — Abdullah Riyami
*Assistant Examiner* — Harshad Patel
(74) *Attorney, Agent, or Firm* — Fish & Richardson P.C.

(57) ABSTRACT

A mobile device has a front frame with a key opening, a first forward facing surface adjacent the key opening and a second forward facing surface adjacent the key opening. The mobile device includes a keypad with keys coupled to a flexible backing. The keypad is insertable from behind the front frame of the mobile device to position the keys into openings in the front frame and laterally expandable to position the keys on opposing lateral sides of the keypad in front of forward facing surfaces of the front frame.

20 Claims, 8 Drawing Sheets

(56) References Cited

U.S. PATENT DOCUMENTS

| | | |
|---|---|---|
| 2006/0061555 A1 | 3/2006 | Mullen |
| 2006/0181509 A1 | 8/2006 | Wang |
| 2006/0258325 A1* | 11/2006 | Tsutaichi et al. ............. 455/350 |
| 2007/0146976 A1 | 6/2007 | Lin |

OTHER PUBLICATIONS

Communication under Rule 71(3) EPC issued in European Application No. 11192250.6 on Oct. 11, 2013; 7 pages.

Office Action issued in Canadian Application No. 2,794,158 on Sep. 29, 2014; 3 pages.

* cited by examiner

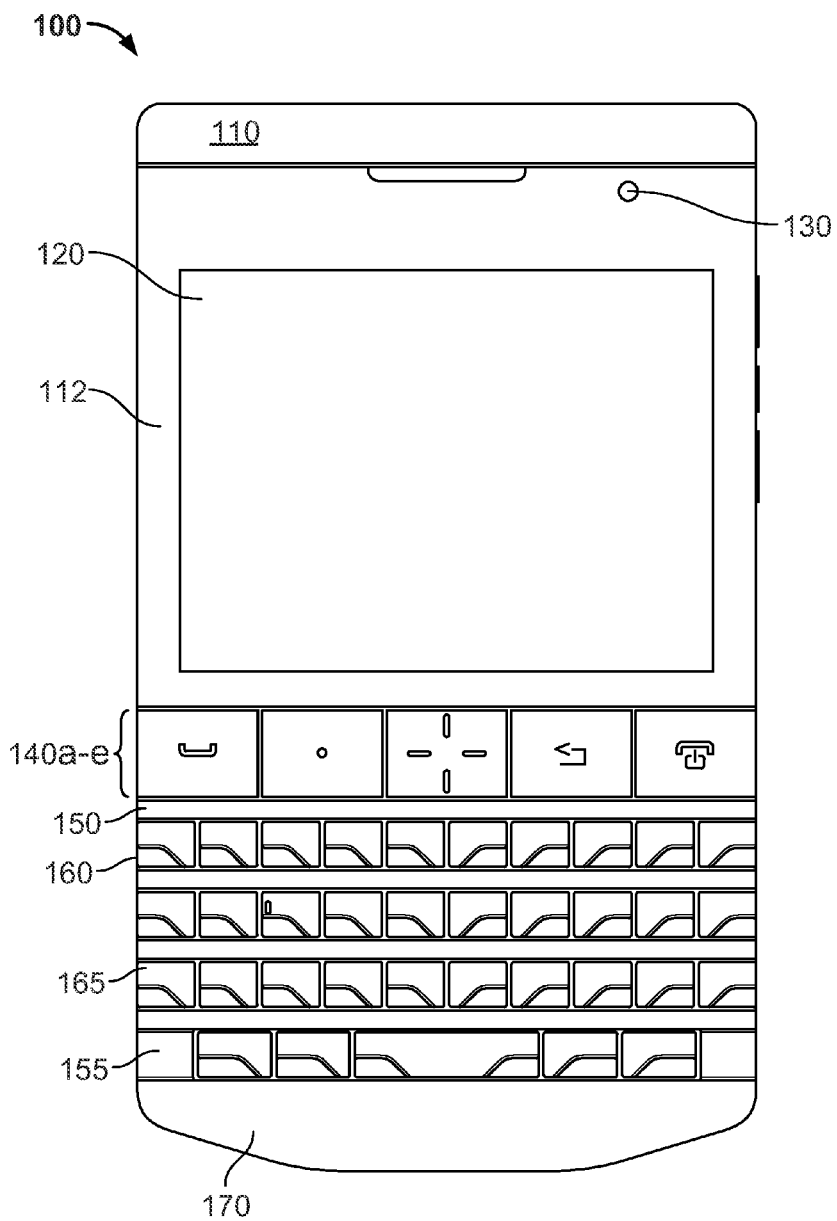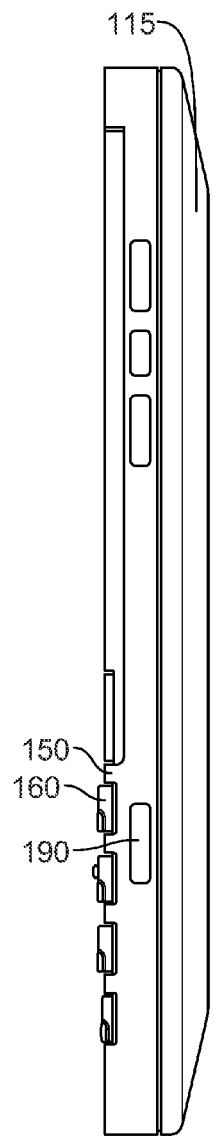
FIG. 1A
FIG. 1B

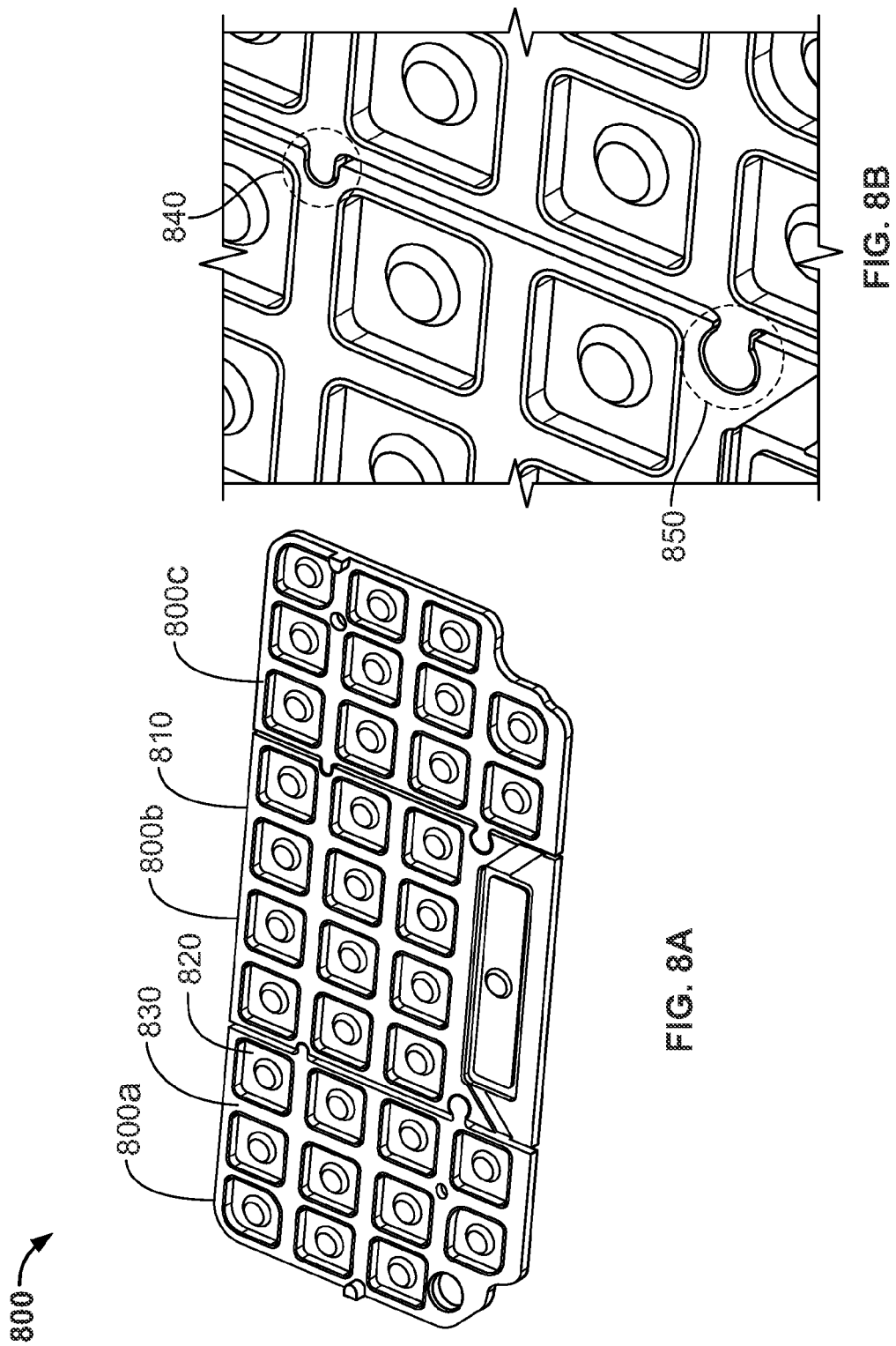

ASSEMBLING A KEYPAD TO A MOBILE DEVICE

BACKGROUND

Mobile electronic devices are commonly integrated with keypads. The keypads allow users to type on the mobile electronic devices for inputting text, commands, etc. Although often of a similar configuration to a full sized keyboard, keypads for mobile devices present different construction and installation challenges, in part, because of their smaller scale and the smaller scale of the mobile device.

DESCRIPTION OF DRAWINGS

FIG. 1A is a front view of a mobile device with a keypad according to the present disclosure.

FIG. 1B is a right side view of the mobile device of FIG. 1A according to the present disclosure.

FIGS. 8A and 8B are perspective views of a second example keypad according to the present disclosure.

Like reference symbols in the various drawings indicate like elements.

DETAILED DESCRIPTION

Figure 2:
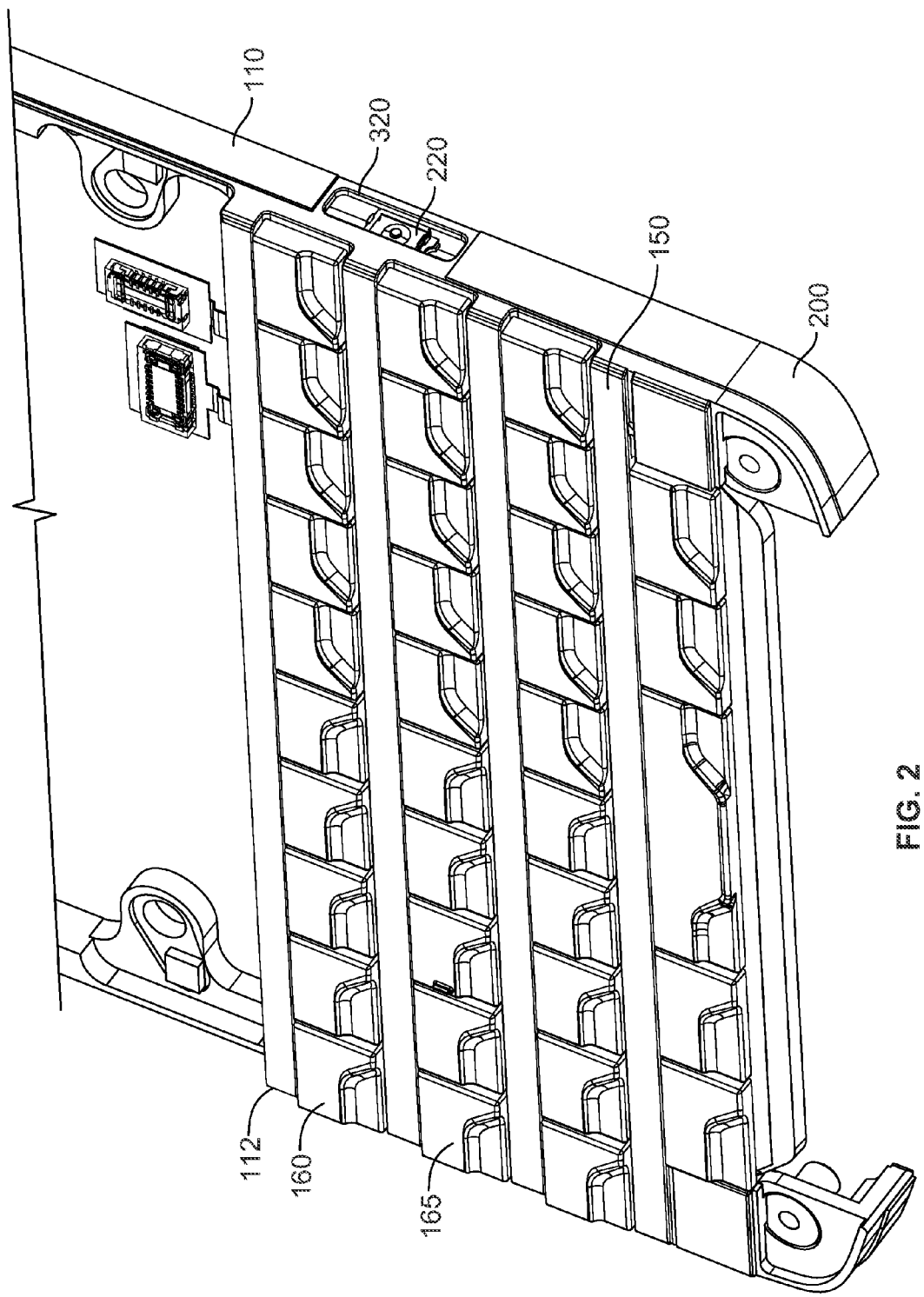
FIG. 2 is a detail perspective view of the mobile device of FIG. 1A, partially assembled, depicting the keypad installed into a front frame according to the present disclosure.

An aspect encompasses a method for assembling a mobile device. In the method a keypad of the mobile device is received. The keypad has a first key at a first edge of the keypad and a second key at a second edge of the keypad. The first key is inserted, from behind a front frame of the mobile device, into an opening in the front frame. The keypad is positioned with the first key in front of a first forward facing surface of the front frame and the second key in front of a second forward facing surface of the front frame by expanding the keypad laterally.

An aspect encompasses a mobile device having a front frame with a key opening. A first forward facing surface is adjacent the key opening and a second forward facing surface is adjacent the key opening. A keypad has a first key coupled to a keypad backing at a first edge of the keypad and a second key coupled to the backing at a second edge of the keypad. The keypad is insertable from behind the front frame of the mobile device to position the first key into an opening in the front frame. The keypad is laterally expandable to position the keypad with the first key in front of the first forward facing surface of the front frame and the second key in front of the second forward facing surface of the front frame.

An aspect encompasses a device with a mobile device housing defining an array of apertures. The housing has a first forward facing surface adjacent the array of apertures and a second forward facing surface adjacent the array of apertures. An array of keys is coupled to a backing The array of keys has a first key at a first location on a perimeter of the array of keys and a second key at a second location on the perimeter of the array of keys. The array of keys is insertable from behind the housing to position the first key into an aperture of the housing and laterally expandable to position the first key in front of the first forward facing surface of the housing and the second key in front of the second forward facing surface of the housing.

FIG. 1A is a front view of a mobile device 100 with a keypad 160 according to the present disclosure. The mobile device 100 can be a cellular phone, including a smart phone, a dedicated personal digital assistant (PDA) with or without phone or data capabilities, an electronic reading device, a tablet computer, a digital media player, or any other mobile device having a keypad. In many instances, the terms "mobile device" and "hand held device" are interchangeable, both regarding to electronic devices available as information stores for personal contacts, calendar appointments, and the like. Additionally, many mobile devices wirelessly connect to the public Internet to allow for the sending and receiving of e-mail. Such mobile devices may also provide more general Internet access, such as access to the World Wide Web. For example, the mobile device 100 may be designed to operate with the General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the mobile device 100.

In certain instances, the mobile device 100 is a two-way RF communication device having voice and data communication capabilities. In addition, the mobile device 100 can have the capability to communicate with other mobile devices or computer systems via the Internet.

The mobile device 100 includes a front frame 110, a screen 120, a number of shortcut control buttons 140a-e, and a keypad 160. A forward facing surface 112 of the front frame 110 forms the forward facing surface of the mobile device 100. The front frame 110 includes a lower cover 170 for users to hold the mobile device 100 when the holding finger is not typing. A back cover 115 (shown in FIG. 1B) is attached to the back side of the front cover, and defines the back surface of the mobile device 100.

The front frame 110 cooperates with the back cover 115 to house inner components of the mobile device 100. The front frame 110 serves as an installation platform for user interface components of the mobile device 100. For example, the screen 120 and the short cut control buttons 140a-e are installed on top of the front frame 110.

The screen 120 can be both an input device (i.e., a touch sensitive device) and an output device (i.e., a display). In some embodiments, the screen 120 is a light emitting diode (LED) backlit liquid crystal display (LCD) with multi-touch control functions. Some of these features may be omitted in other examples. For example, the screen 120 may lack the multi-touch control functions, or the screen 120 may lack the LED backlit feature.

In some embodiments, the mobile device 100 may include additional features, such as a front camera 130.

The shortcut buttons 140a-e are dedicated buttons for specific functions in the mobile device 100. In some embodiments, the shortcut buttons may include more than one input mechanism. For example, the shortcut buttons can include pressure sensors and/or optical sensors for navigational up-down-left-right input. In certain instances, the shortcut buttons can activate a specific operation mode of the mobile device, such as a mode for cellular phone, a mode for applications, a mode for internet browsing, etc. The illustrated shortcut buttons 140a-e are separated from the keypad 160; however, in some embodiments, the shortcut buttons 140a-e can be integrated into the keypad 160. In certain instances, the shortcut buttons 140a-e could alternately or additionally be implemented as virtual buttons on a touchscreen display.

The front frame 110 is generally planar and rectangular in shape, and defines openings in its forward facing surface 112 to receive the screen 120, the shortcut buttons 140a-e and the keys of the keypad 160. The front frame 110 has frets 150 (four shown, but fewer or more could be provided) that span laterally between the left and right sides of the front frame 110 to define elongate key receiving openings 155. The key receiving openings 155 receive rows of keys of the keypad 160. The frets 150 separate the multiple rows of the keys of the keypad 160. In certain instances, the width of each fret 150 would allow a user's thumbs pressing down a key without pressing down keys in neighboring rows.

FIG. 1B is the side view of the mobile device 100 according to the present disclosure. This perspective shows that the keypad 160 can include a side key 190 installed on the sidewall of the mobile device 100. Although in this illustration there is only one side key 190 associated with the keypad 160, in some embodiments, there can be two or more side keys integrated with the keypad 160.

FIG. 2 is a perspective view of the keypad 160 installed into the front frame 110 according to the present disclosure. Certain components are omitted in this view to show the structure of the front frame 110. For example, the screen, the lower cover, the back cover and the side key cover are omitted in this view. As illustrated, the front frame 110 can include a vertically upstanding sidewall 200 on its outer perimeter. A side key mechanism 220 extends through a side key opening 320 of the sidewall 200. Of note, the keys 165 of the keypad 160 extend to the edges of the device, so that the side edges of the keys are flush (substantially flush as shown, or completely flush) with the outward facing surface of the sidewall 200. The forward facing surfaces of the keys 165 are also flush (substantially flush as shown, or completely flush) with the forward facing surface 112 of the front frame 110.

Figure 3:
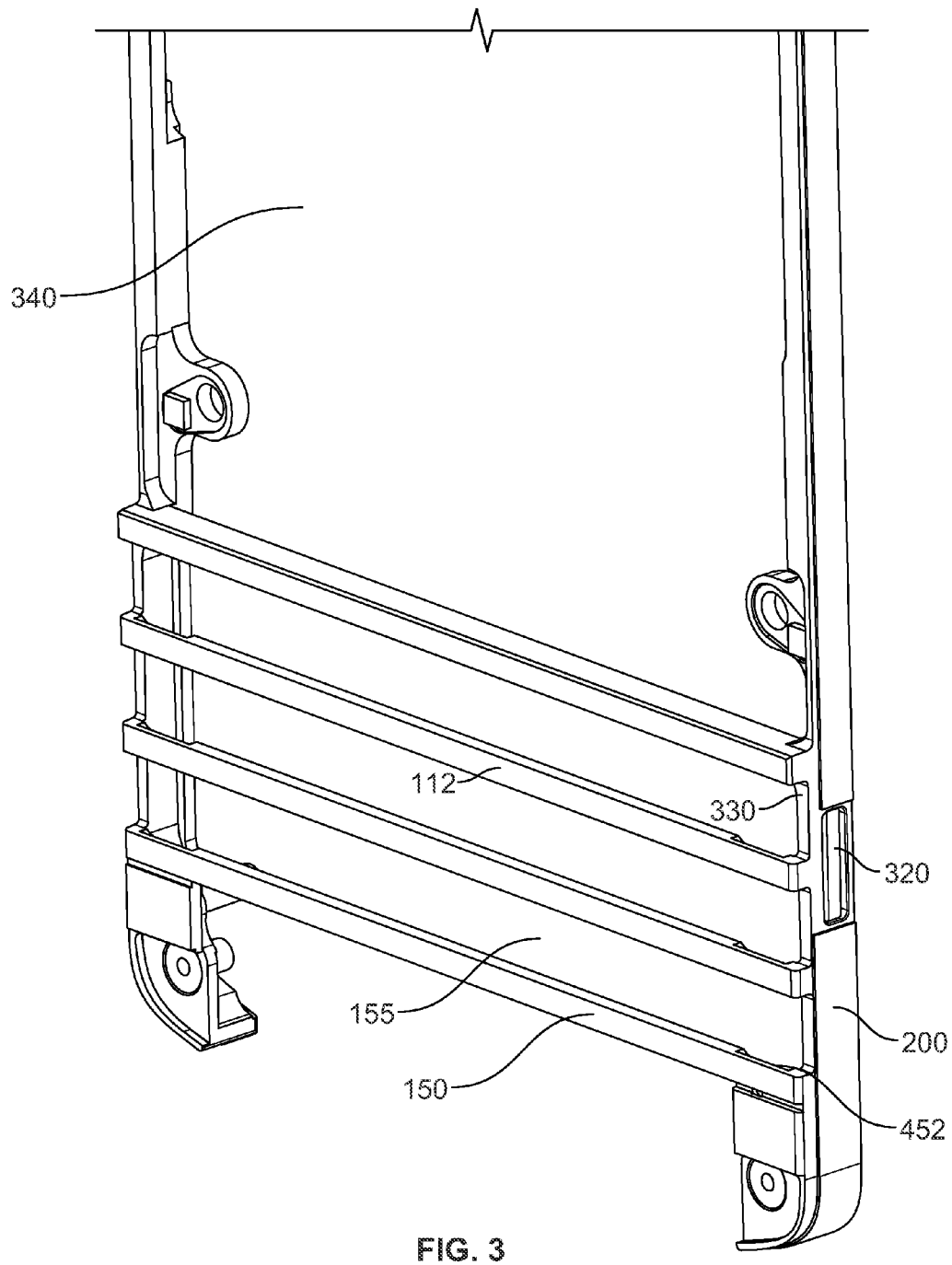
FIG. 3 is a detail perspective view of the front frame of the mobile device of FIG. 1A according to the present disclosure.

FIG. 3 is a perspective view of the front frame 110 of the mobile electronic device 100 according to the present disclosure. In this view only the front frame 110 is displayed. At the forward facing surface 112 of the front frame 110, the key openings 155 span the entire width of the front frame 110—from the outer surface of the sidewall 200 on one side of the device to the opposing outer surface of the sidewall 200 on the other side of the device. Back from the forward facing surface 112 (i.e., in a direction towards the back cover 115 of the device 100), however, the key openings 155 span between the inner surfaces of the sidewall 200, and define forward facing edge surfaces 330 atop the sidewall 200. The screen opening 340 for the screen 120 has a similar configuration. As previously described above, the side key opening 320 for the side key 190, as shown in FIGS. 1A and 1B, is also provided in the sidewall 200.

Figure 4:
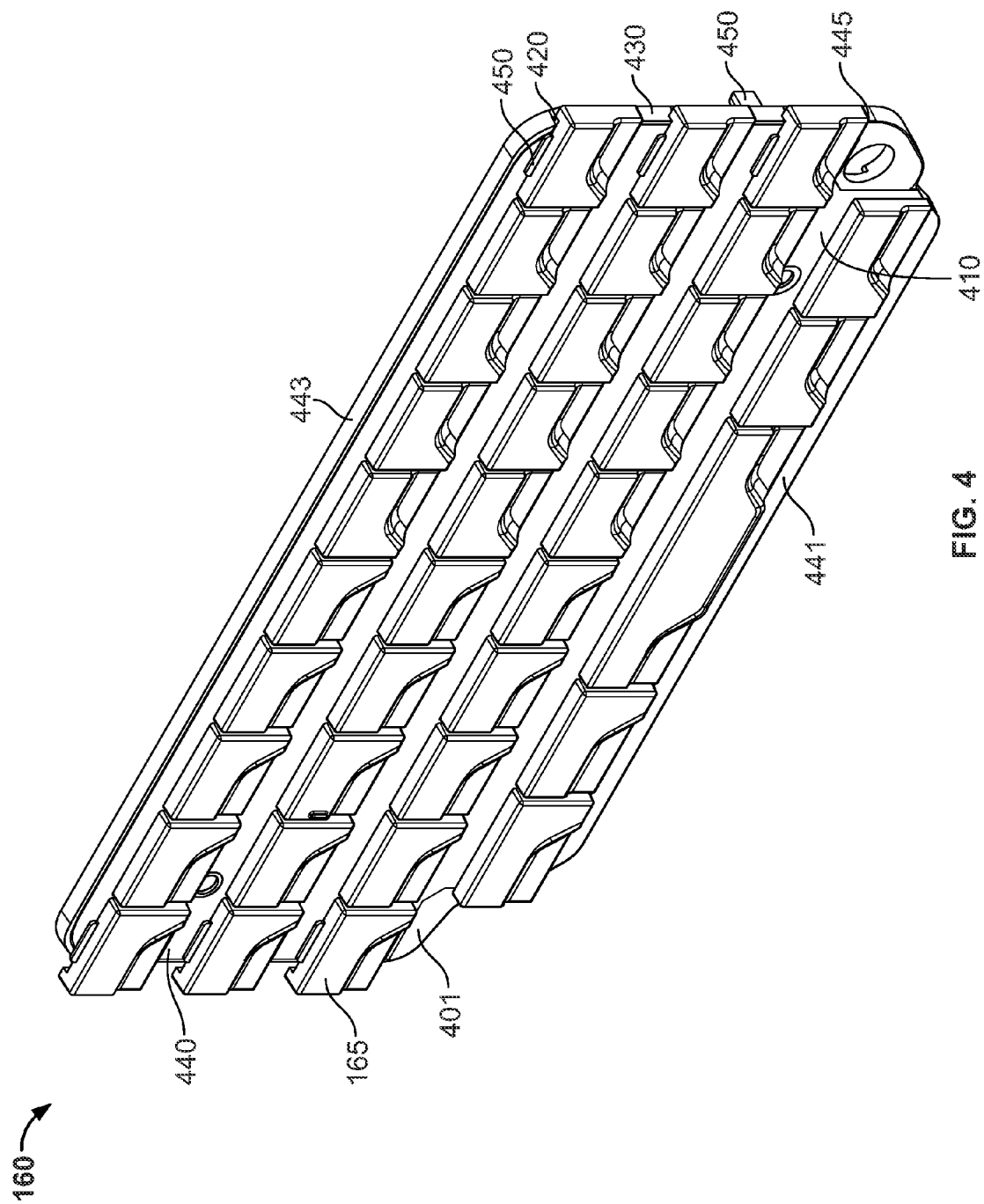
FIG. 4 is a perspective view of a keypad according to the present disclosure.

FIG. 4 is a perspective view of the keypad 160 according to the present disclosure. The keypad 160 includes a number of keys 165 distributed in a keyboard layout. The keyboard layout can be ISO/IEC 9995 or similar. In some embodiments, the keyboard layout can be other than the ISO/IEC 9995 standard and tailored to specific purposes. The keys 165 can be rigid, made of a hard material such as plastic, metal, or other material. The forward facing surface of the keys 165 is flat and/or shaped to accommodate the human fingers, so as to be easily depressed, pushed, or recognized.

The keys 165 along the right and left side edges of the keypad 160 are those that, as described with respect to FIG. 2, extend to the side edges of the device. The keys 165 along the right and left side edges of the keypad 160 can, as shown, also include anti-pick flanges 450 that protrude from the top and bottom of each key 165 along the right and left side edges of the keypad. When installed in the front frame, the anti-pick flanges 450 abut the back side of adjacent front frame frets 150 and block the keys 165 from being lifted forward, i.e. picked, off the keypad 160. In certain instances, the anti-pick flanges 450 can mate with corresponding receptacles 452 (FIG. 3) in the back surface of the frets 150. Also of note, additional keys 165 can be provided with the anti-pick flanges 450.

The keypad 160 includes a backing 401 that carries the keys 165. The backing 401 includes a flexible sheet onto which the keys are affixed and a frame 440 that forms a grid behind the keys 165 to support the flexible sheet. The frame 440 has a bottom 441, a top 443, and opposing sides 445, and forms the perimeter of the backing 401. The keys 165 at the sides 445 of the keypad 160 extend over, i.e. overhang, the sides 445, thereby enabling the sides 445 of the keys 165 at the left and right side edges of the keypad to be substantially flush with the sidewalls 200 of the device 100. The backing 401 can be constructed of elastically bendable materials that enable the backing 401 to be deformed between a laterally extended state (shown in FIG. 4) and a laterally contracted state where, as will be described in more detail below, the keypad 160 can be inserted through the back of the front frame for assembly of the keypad 160 to the mobile device.

In some embodiments, the frame 440 is made of materials that are of different levels of transparency. For example, the frame 440 includes transparent sections 420 and opaque sections 430. The transparent sections 420 are positioned directly behind the keys 165 to transmit light from a back light (not shown) to illuminate the keys 165. The opaque sections 430 are positioned between adjacent rows of keys 165 to block light from the back light, and thus prevent light bleed around the keys 165. The transparent sections 420 and the opaque sections 430 can be arranged into parallel strips spanning between the sides 445 of the backing 401 to distribute light evenly to the keys 165. The transparent sections 402 can span to the perimeter of the backing 401 to facilitate lighting the edge most keys 165. The backing 401 additionally includes an opaque light shield 410 behind the keys 165 to control the distribution of light.

Figure 5:
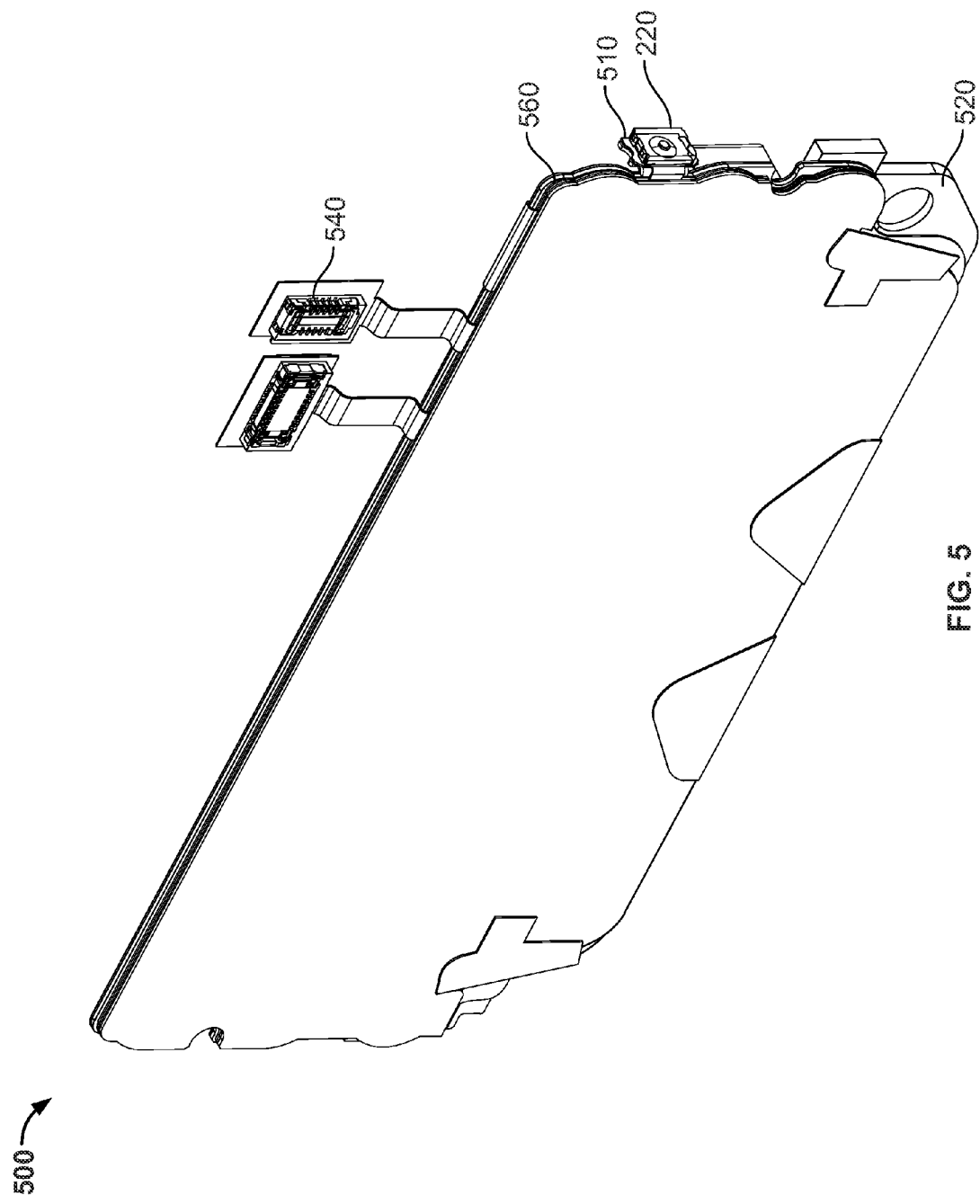
FIG. 5 is a perspective view of a base for the keypad according to the present disclosure.

FIG. 5 is a perspective back side view of a generally planar base 500 for the keypad 160 according to the present disclosure. The base 500 can include a number of different layers forming an elastically bendable structure. In general, however, the base 500 has a flexible printed circuit board that integrates various electrical circuits that convert movement of keys 165 into electrical signals that can be received by a processor (not shown) of the mobile device 100. The electrical circuits are connected to other components of the mobile device via connectors 540. The base 500 includes a metal stiffening assembly 520, which includes a number of metal layers that stiffen the base 500 to support against key presses. The base 500, however, is also flexible enough to elastically deform between a laterally extended state (shown in FIG. 5) and a laterally contracted state where, as will be described in more detail below, the base 500 can be inserted through the back of the front frame 110 for assembly of the base 500 to the mobile device 100. The stiffening assembly 520 also includes a side key support 510 that projects orthogonally (substantially orthogonally as shown, or precisely orthogonally) to the remainder of the base 500 and serves as an attachment and support for the side key assembly 220.

Figure 6:
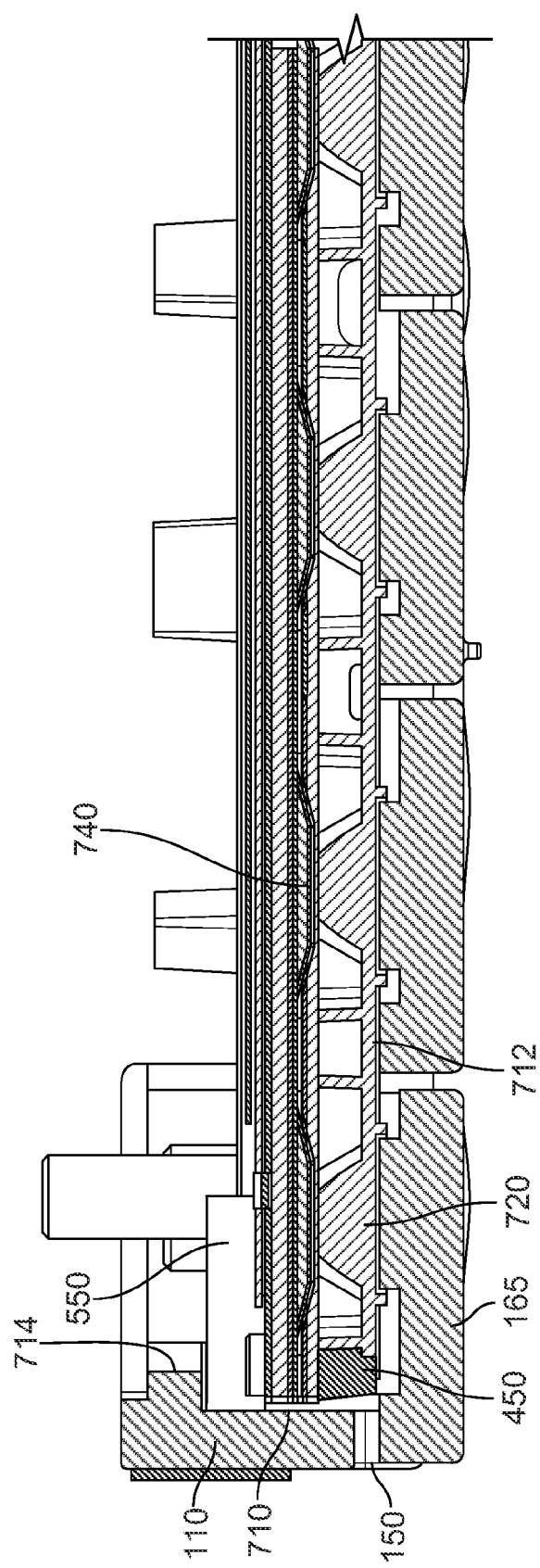
FIG. 6 is a detail, end cross sectional view of the keypad of FIG. 4 installed in the front frame of the mobile device of FIG. 1A according to the present disclosure.

FIG. 6 is a cross section view of the keypad 160 and base 500 installed in the front frame 110 according to the present disclosure. The front frame 110 defines an installation space 710 for receiving the keypad 160 and the base 500. The keypad 160 and base 500 are beneath base retaining shoulders 714 formed on the inner wall of the front frame 110. A flexible spacer 550, for example made of foam or another material, abuts the shoulder 714 and retains the keypad 160 and base 500 in position with the keypad 160 abutting the back side of the front frame 110. The flexible sheet 712 of keypad backing 401 is shown with frusta-conical key springs 720 formed into the sheet behind each of the keys 165. The flexible sheet 712 can be made of resilient material, such as silicone rubber or other material, so that the key springs 720 compress and springingly return the keys 165 in response to key presses. A key dome and circuit assembly 740 includes the printed circuit board (e.g., composite material coated with circuitry) and key domes that translate movement of the keys, i.e., key presses, into electrical signals.

Figure 7:
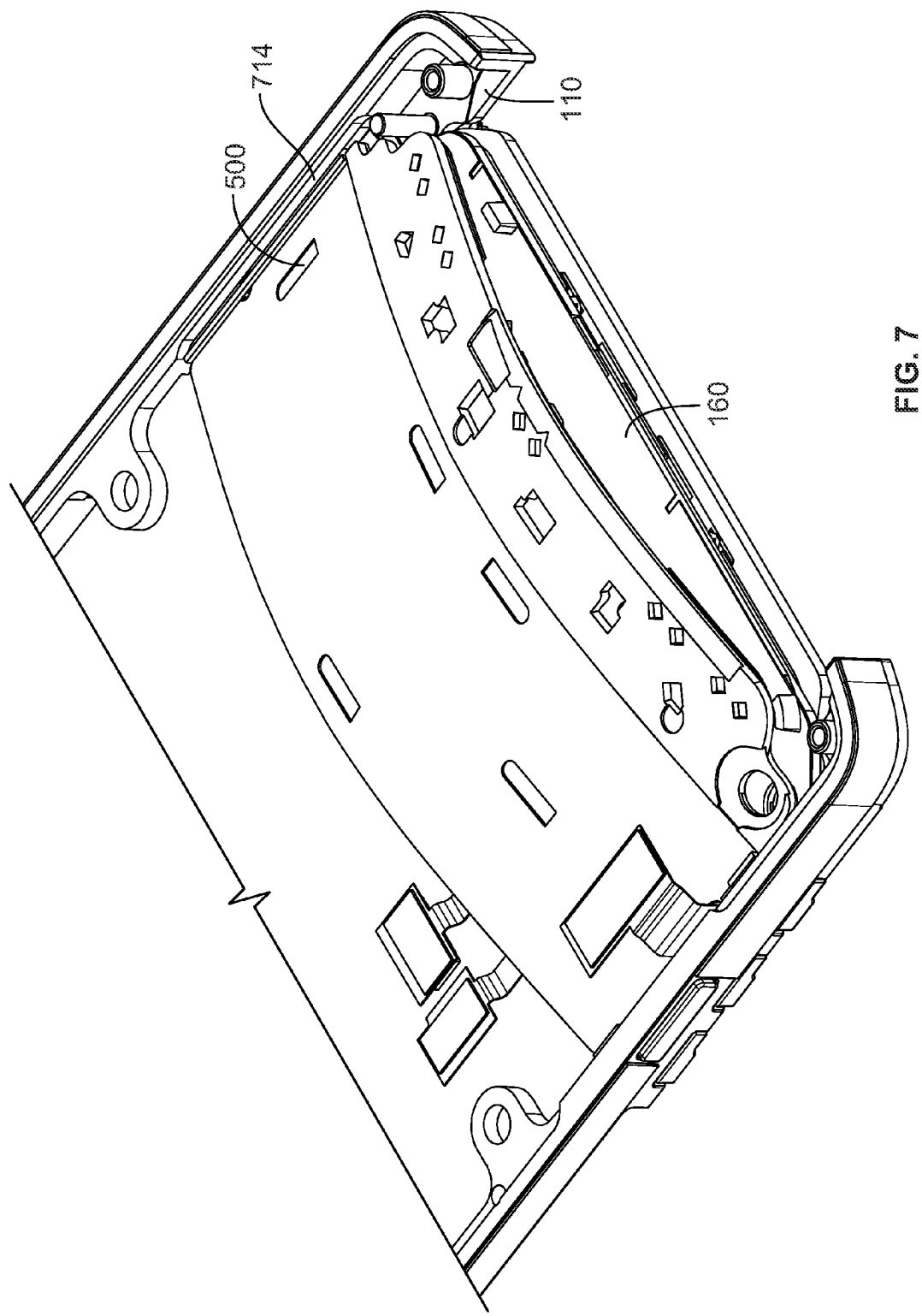
FIG. 7 is a detail perspective view of the mobile device of FIG. 1A showing an installation of the keypad of FIG. 4 and the base to the front frame according to the present disclosure.

Turning now to FIG. 7 with occasional reference to FIGS. 1-6, the operator/machine performing the installation process receives the keypad 160 of the mobile device 100 oriented (or orients it) with the keys 165 toward the back side of the front frame 110. The keypad 160 is elastically deformed into a laterally contracted state, with the backing 401 of keypad 160 bent into an arced or curved shape similar to the arced shape of the base 500 shown in FIG. 7. In the laterally contracted state, the greatest distance, measured linearly across the keypad 160, between the outer side edges of the left and right most edge keys 165 is less than the smallest distance the keypad 160 must pass through to position the keys 165 in the opening 155. In certain instances, that smallest distance is the distance between the innermost edges of the left and right front facing edge surfaces 330 (FIG. 3). In other instances, the inner surface of the front frame 110 may have other features, such as the base retaining shoulders 714, that protrude laterally inward and that the keys 165 must pass.

The keys 165 on one edge of the keypad 160 are inserted from behind the front frame 110 of the mobile device 100 through the opening 155, such that the keys 165 overhang the corresponding front facing edge surface 330. For example, keys 165 on the right side edge of the keypad 160 can be inserted through the opening 155 and positioned to overhang the right side front facing edge surface 330. The keypad 160 can then be pivoted down to insert the keys 165 on the opposing edge through the opening 155. In the example where the keys 165 on the right side edge of the keypad 160 were initially inserted through the opening 155, the keypad 160 is pivoted down to insert the keys 165 on the left side edge of the keypad 160 through the opening 155. When the keypad 160 is released from the laterally contracted state, it elastically returns to a laterally expanded state, and the keys 165 pivoted through the opening 155 move laterally over and in front of the front facing edge surface 330. The result is that both the keys 165 on the left side edge and the right side edge of the keypad 160 are positioned in front of the left and right front facing edge surface 330 (see FIG. 2).

Installation of the base 500 is similar. The operator/machine performing the installation process receives the base 500 oriented (or orients it) with its front surface toward the back side of the front frame 110. The base 500 is elastically deformed into a laterally contracted state as shown in FIG. 7, with the base 500 bent into an arced or curved shape, and positioned behind the key top 160. In the laterally contracted state, a side edge of the base 500 can be positioned under the corresponding base retaining shoulder 714, and the base 500 pivoted down passing the opposing base retaining shoulder 714 to abut the keypad 160. In instances where the base 500 includes a side key assembly 220 (see FIG. 2), the side key assembly 220 can be placed through the side key opening 320, and then the base 500 pivoted down to abut the keypad 160. When the base 500 is released from the laterally contracted state, it elastically returns to a laterally expanded state. In the laterally expanded state, the left and right edges of the base 500 are adjacent the inner surface of the front frame 110 and positioned under the right and left side retaining shoulders 714 (see FIG. 6).

In certain instances, the keypad 160 and base 500 can be inserted into front frame 110 together. For example, the keypad 160 and base 500 can be held together in their respective laterally contracted states, positioned in the front frame 110 together, then allowed to return to their laterally expanded states.

FIGS. 8A and 8B are perspective, back side views of a second example keypad 800 according to the present disclosure. Like the keypad 160 described above, the keypad 800 has rigid keys and a backing 810 with a flexible sheet 820 onto which the keys are affixed. A frame 830 forms a grid behind the keys to support the flexible sheet 820. The frame 810, however, need not be elastically bendable like the frame 440 to fit into the front frame of the mobile device. Rather, the keypad 800 includes a plurality of separable sections—three shown (right 800a, middle 800b, and left 800c)—that can be disassembled and individually placed in the front frame of the mobile device. As they are placed in the mobile device, they are assembled together to a laterally expanded state with alignment features 840 and locking features 850 shown in FIG. 8B. The alignment features 840 and locking features 850 can be male-female couplings of various geometric shapes. In the embodiment shown in FIG. 8B, the alignment features 840 have a male protrusion that can be laterally inserted into the female receptacle of the adjacent section. The locking features 850 have a male protrusion with a generally circular shape that locks into a corresponding generally circular female receptacle of an adjacent section to retain the sections against laterally separating. In other instances, fewer or more sections could be provided.

The elastically bendable keypad and manner of construction described herein allows construction of a mobile device to have keys that overlap features of the front facing frame of the device, and in certain instances keys that extend to the edges of the device. The segmented keypad and manner of construction allows similar features. If provided, the anti-pick flanges retain the keys to the frame, even though the keys are in front of features of the frame.

A number of implementations have been described. Nevertheless, it will be understood that various modifications may be made. Accordingly, other implementations are within the scope of the following claims.

What is claimed is:
1. A method for assembling a mobile device, comprising:
   receiving a keypad of the mobile device, the keypad having a first key at a first edge of the keypad and a second key at a second edge of the keypad;
   inserting, from behind a front frame of the mobile device, the first key into an opening in the front frame; and
   positioning the keypad with the first key in front of a first forward facing surface of the front frame and the second key in front of a second forward facing surface of the front frame by expanding the keypad laterally.

2. The method of claim 1, where expanding the keypad laterally comprises expanding the keypad from a laterally contracted state, where the keypad is elastically compressed, to a laterally expanded state.

3. The method of claim 2, where the first key and the second key are rigid and coupled to a backing that is elastically bendable between:
the laterally contracted state, where a greatest linear distance between outer side edges of the first key and the second key is less than a smallest linear distance between the first forward facing surface and the second forward facing surface; and
the laterally expanded state, where a greatest linear distance between the outer side edges of the first key and the second key is greater than the smallest linear distance between the first forward facing surface and the second forward facing surface.

4. The method of claim 1, where the first key and the second key are rigid and coupled to a backing that is elastically bendable; and
where positioning the keypad with the first key in front of a first forward facing surface of the front frame and the second key in front of a second forward facing surface of the front frame by expanding the keypad laterally further comprises positioning the keypad with the backing behind the first and second forward facing surfaces.

5. The method of claim 1, where the keypad comprises a plurality of separable sections;
where inserting the first key into an opening in the front frame comprises inserting the first key carried on a first section of the keypad; and
where expanding the keypad laterally comprises assembling a second section of the keypad, with the second key carried on the second section, to the first section of the keypad.

6. The method of claim 5, where assembling the second section of the keypad to the first second of the keypad comprises inserting a male alignment feature of the first section into a female alignment feature of the second section.

7. The method of claim 1, where the first forward facing surface is adjacent an outer sidewall on a first side of the mobile device and the second forward facing surface is adjacent an outer sidewall on a second side of the mobile device, opposite the first side.

8. The method of claim 1, wherein positioning the keypad with the first key in front of a first forward facing surface of the front frame and the second key in front of a second forward facing surface of the front frame by expanding the keypad laterally, further comprises positioning the keypad with an edge of the first key flush with an outer sidewall of the mobile device and positioning an edge of the second key flush with the outer sidewall of the mobile device.

9. The method of claim 1, where the first key and the second key are coupled to a backing, the perimeter of the backing having transparent sections proximate the first key and the second key and opaque sections.

10. The method of claim 1, where inserting, from behind a front frame of the mobile device, the first key into an opening in the front frame comprises inserting, from behind the front frame of the mobile device, the first key into an opening in a front surface of the front frame; and
where the method further comprises inserting, from behind the front frame of the mobile device, a third key into an opening in a sidewall of the front frame.

11. The method of claim 1, where inserting, from behind a front frame of the mobile device, the first key into an opening in the front frame comprises inserting, from behind the front frame of the mobile device, the first key into an opening in the front frame with an outwardly extending anti-pick flange of the first key behind the front frame.

12. A mobile device, comprising:
a front frame having a key opening, a first forward facing surface adjacent the key opening, a second forward facing surface adjacent the key opening; and
a keypad having a first key in a first row of adjacent keys coupled to a keypad backing at a first edge of the keypad and a second key in a second row of adjacent keys coupled to the backing at a second edge of the keypad, the keypad insertable from behind the front frame of the mobile device to position the first key into the key opening in the front frame and laterally expandable to position the keypad with a portion of the first key overlapping the first forward facing surface and a portion of the second key overlapping the second forward facing surface; where the keypad backing comprises an elastically bendable keypad backing that is compressible between:
a laterally extended state where the first key is in front of the first forward facing surface and the second key is in front of the second forward facing surface; and a laterally contracted state where a greatest linear distance between outer side edges of the first key and the second key is less than the smallest linear distance between the first forward facing surface and the second forward facing surface.

13. The mobile device of claim 12, where the keypad backing comprises an elastically bendable keypad backing that is compressible between:
a laterally extended state where the first key is in front of the first forward facing surface and the second key is in front of the second forward facing surface; and
a laterally contracted state where a greatest linear distance between outer side edges of the first key and the second key is less than the smallest linear distance between the first forward facing surface and the second forward facing surface.

14. The mobile device of claim 12, where the keypad comprises a plurality of separable sections, the plurality of separable sections comprising a first section carrying the first key and a second section carrying the second key, and where the keypad is expandable by coupling the first section to the second section.

15. The mobile device of claim 12, where the front frame resides between the first key and the keypad backing and between the second key and the keypad backing.

16. A device, comprising:
a mobile device housing defining an array of apertures, the housing having a first forward facing surface adjacent the array of apertures and a second forward facing surface adjacent the array of apertures; and
an array of keys coupled to a backing, the array of keys having a first key at a first location on a perimeter of the array of keys and a second key at a second location on the perimeter of the array of keys, the array of keys insertable from behind the housing to position the first key into an aperture of the housing and laterally expandable to position a portion of the first key overlapping the first forward facing surface and a portion of the second key overlapping the second forward facing surface; where the keypad backing comprises an elastically bendable keypad backing that is compressible between: a laterally extended state where the first key is in front of the first forward facing surface and the second key is in front of the second forward facing surface; and a laterally contracted state where a greatest linear distance between outer side edges of the first key and the second key is less than the smallest linear distance between the first forward facing surface and the second forward facing surface.

17. The device of claim 16, where the backing comprises an elastically bendable structure, the elastically bendable structure bendable between a laterally contracted state, where the backing is elastically compressed, to a laterally expanded state.

18. The device of claim 17, where the keys are rigid.

19. The device of claim 16, where the backing comprises a plurality of separable sections, the plurality of separable sections comprising a first section with the first key and a second section with the second key.

20. The device of claim 16, where the mobile device housing resides between the array of keys and the backing.

\* \* \* \* \*